United States Patent

(12) United States Patent
Wu et al.

(10) Patent No.: US 11,354,904 B2
(45) Date of Patent: Jun. 7, 2022

(54) SPATIAL-TEMPORAL GRAPH-TO-SEQUENCE LEARNING BASED GROUNDED VIDEO DESCRIPTIONS

(71) Applicant: International Business Machines Corporation, Armonk, NY (US)

(72) Inventors: Lingfei Wu, Elmsford, NY (US); Liana Fong, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 16/926,124

(22) Filed: Jul. 10, 2020

(65) Prior Publication Data

US 2022/0012499 A1   Jan. 13, 2022

(51) Int. Cl.
  *G06K 9/00*   (2022.01)
  *G06V 20/40*   (2022.01)
  *G06K 9/62*   (2022.01)
  *G06F 16/901*   (2019.01)
  *G06N 3/04*   (2006.01)

(52) U.S. Cl.
  CPC .......... *G06V 20/46* (2022.01); *G06F 16/9024* (2019.01); *G06K 9/628* (2013.01); *G06K 9/6215* (2013.01); *G06N 3/04* (2013.01)

(58) Field of Classification Search
  CPC .. G06K 9/00744; G06K 9/6215; G06K 9/628; G06N 3/04; G06F 16/9024
  See application file for complete search history.

(56) References Cited

U.S. PATENT DOCUMENTS

| 7,143,434 | B1 | 11/2006 | Paek et al. |
| 7,254,285 | B1 | 8/2007 | Paek et al. |
| 8,370,869 | B2 | 2/2013 | Paek et al. |
| 10,699,129 | B1* | 6/2020 | Jiang ................. G06K 9/00718 |
| 2016/0179965 | A1* | 6/2016 | Bhatia ................. G06F 16/9535 707/749 |
| 2021/0089765 | A1* | 3/2021 | Ling ................. G06K 9/00463 |

OTHER PUBLICATIONS

Graph Partitioning and Graph Neural Network based Hierarchical Graph Matching for Graph Similarity Computation, by Haoyan Xu (Year: 2020).*

(Continued)

*Primary Examiner* — Dhaval V Patel
(74) *Attorney, Agent, or Firm* — Patterson + Sheridan, LLP

(57) ABSTRACT

Techniques for generating a grounded video description for a video input are provided. Hierarchical Attention based Spatial-Temporal Graph-to-Sequence Learning framework for producing a GVD is provided by generating an initial graph representing a plurality of object features in a plurality of frames of a received video input and generating an implicit graph for the plurality of object features in the plurality of frames using a similarity function. The initial graph and the implicit graph are combined to form a refined graph and the refined graph is processed using attention processes, to generate an attended hierarchical graph of the plurality of object features for the plurality of frames. The grounded video description is generated for the received video input using at least the hierarchical graph of the plurality of features.

20 Claims, 7 Drawing Sheets

(56) References Cited

OTHER PUBLICATIONS

Zhou et al. "Grounded Video Description", Proceedings of the IEEE/CVF Conference on Computer Vision and Pattern Recognition (CVPR), 2019, pp. 6578-6587.
Yao et al., "Exploring Visual Relationship for Image Captioning", The European Conference on Computer Vision (ECCV), 2018, pp. 684-699.
Tomei, et al., "STAGE: Spatio-Temporal Attention on Graph Entities for Video Action Detection", 2019.

\* cited by examiner

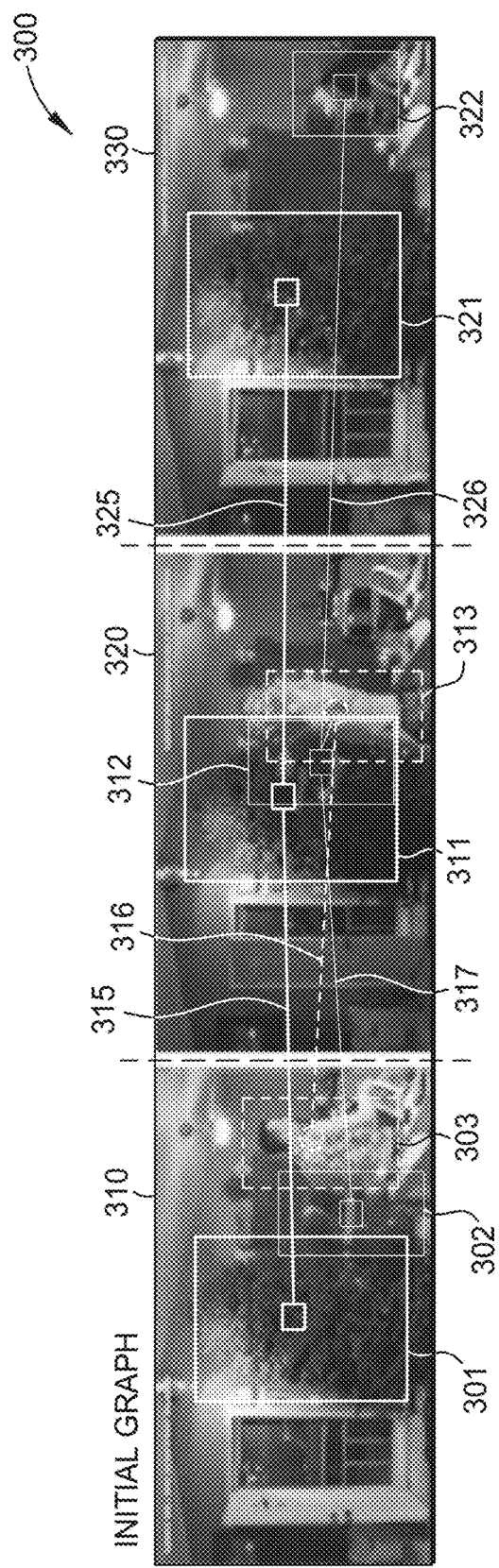
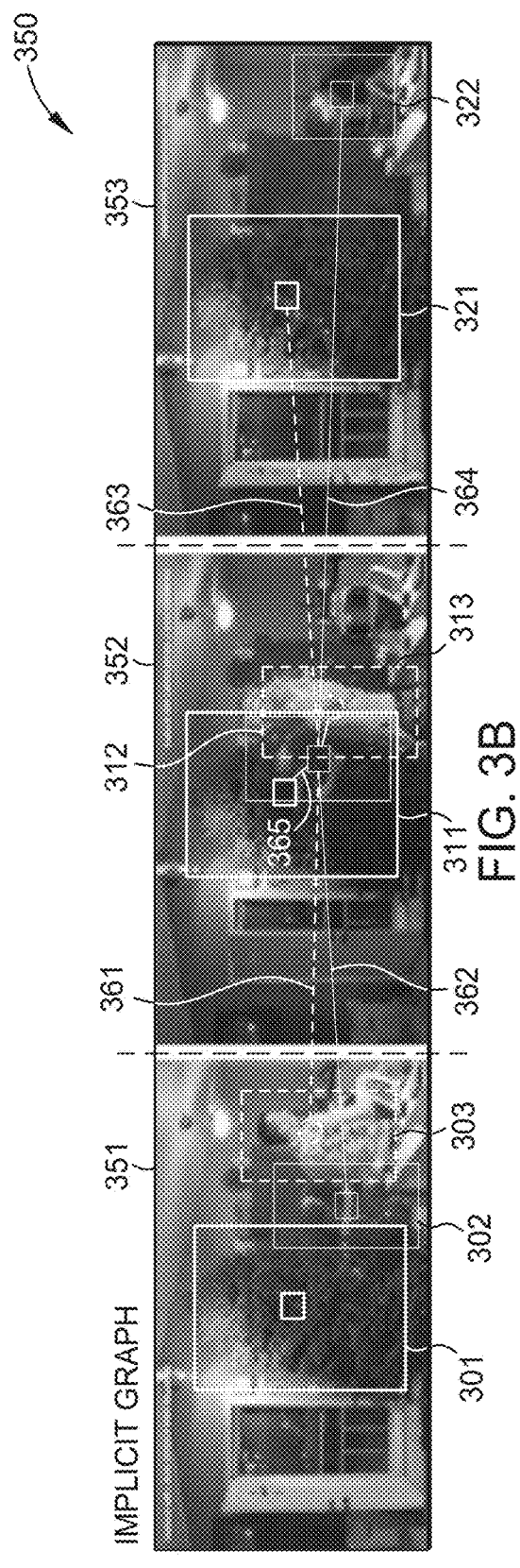
FIG. 3A
FIG. 3B

SPATIAL-TEMPORAL GRAPH-TO-SEQUENCE LEARNING BASED GROUNDED VIDEO DESCRIPTIONS

BACKGROUND

The present invention relates to generating grounded video descriptions for video content, and more specifically, to using spatial and temporal relationships derived from the video content and modeled in relational graphs to generate the grounded video description.

Video cameras capturing video content are increasingly ubiquitous in all areas of life, including varied applications in commercial, industrial, and consumer environments. These cameras and other video producing components generate large amounts of video content that, while helpful for their given task, can be hard to organize and process at later dates due to the sheer size of content libraries and the effort needed to manually describe the video content. In order to provide insight into what the video content actually contains, some video analysis processes exist which attempt to identify what is occurring in the captured video through various video processing methods and generate word descriptors based on the processed video content. These descriptors attempt to provide a succinct description of the video content.

However, the current methods for analyzing and providing descriptive insight into video content fail to provide contextual or grounded descriptions. While some of these processes may generate rough keywords or other generally descriptive information, these generated descriptions often highlight only what is happening at a certain focused time (e.g., in one frame of a video) and fail to accurately describe what is happening in the video content over both space and time. These ungrounded descriptions may result in misidentified, irrelevant, or incorrect descriptions being produced for the video content. There remains a need for contextual descriptions for video content which provide descriptions across a video content clip.

SUMMARY

According to one embodiment of the present disclosure, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method includes generating an initial graph representing a plurality of object features in a plurality of frames of a video input, generating an implicit graph for the plurality of object features in the plurality of frames using a similarity function, combining the initial graph and the implicit graph to form a refined graph, processing the refined graph, using attention processes, to generate an attended hierarchical graph of the plurality of object features for the plurality of frames, and generating a grounded video description for the received video input using at least the hierarchical graph. Advantageously, the method produces improved grounded video descriptions by using relation graphs to provide both temporal and spatial relations across multiple frames of a video input. Other embodiments of this aspect include corresponding computer systems, apparatus, and computer programs recorded on one or more computer storage devices, each configured to perform the actions of the methods.

According to another embodiment of the present disclosure, the initial graph may include a plurality of subgraphs, where each subgraph of the plurality of subgraphs is associated with a frame of the plurality of frames and generating the initial graph may include: determining a plurality of object feature proposals for each subgraph, classifying each object feature proposal in each subgraphs based on spatial information in the subgraph, and adding a temporal relationship edge between object features present in more than one subgraph. This advantageously provides a base initial graph to at least represent basic structural and temporal relations across frames in the video input.

According to another embodiment of the present disclosure, generating the initial graph may also include utilizing one of a k-nearest neighbor (KNN) algorithm or a pre-trained relation classifier. Advantageously, this allows the initial model to be generated using with or without externally provided information. This improves the model without requiring additional labor or cost.

According to still another embodiment of the present disclosure, generating an implicit graph for the plurality of object features in the plurality of frames may include: determining, using a weighted similarity function, a weight adjustment for each object feature proposal, and adding a temporal relationship edge between object features present in more than one subgraph based on the weight adjustment of the object feature proposal. This advantageously provides a weighted implicit graph to at least represent strongly correlated relationships across frames in the video input.

According to another embodiment of the present disclosure, combining the initial graph and the implicit graph to form a refined graph further may include: aggregating object features present in a plurality of subgraphs of the refined graph to represent deep correlations of the object features in the refined graph. An advantage of such an embodiment is that aggregating the object features can add additional weight in the models to relevant objects in the video frames.

According to another embodiment of the present disclosure, processing the refined graph to generate a hierarchical graph of the plurality of features for the plurality of frames may include: determining a vector representation for each subgraph in the refined graph, calculating an attention score for each of the vector representations, calculating an attention score for each object feature in each subgraph, and producing a graph feature based on the attention scores. An advantage of such an embodiment is that the refined graph provides attention scores for each subgraph which emphasizes a most relevant frame and object features for us in a natural language algorithm.

According to another embodiment of the present disclosure, generating the grounded video description may include: applying the graph feature in a language long short-term memory (LSTM) algorithm to determine the inclusion of a word associated with an object feature in the grounded video description. An advantage of such an embodiment is that the language LSTM provides an accurate and relevant GVD. Implementations of the described techniques may include hardware, a method or process, or computer software on a computer-accessible medium.

According to a different embodiment of the present disclosure, any combination of the above-discussed embodiments can be implemented by one or more computer-readable storage media. The computer-readable storage media collectively contain computer program code that, when executed by operation of one or more computer processors, performs an operation. In embodiments, the operation performed can correspond to any combination of the above methods and embodiments.

According to yet another different embodiment of the present disclosure, any combination of the above-discussed embodiments can be implemented by a system. The system includes one or more computer processors, and one or more memories collectively containing a program which, when executed by the one or more computer processors, performs an operation. In embodiments, the operation performed can correspond to any combination of the above methods and embodiments.

BRIEF DESCRIPTION OF THE SEVERAL VIEWS OF THE DRAWINGS

FIG. 3A illustrates an initial graph, according to embodiments described herein.

FIG. 3B illustrates an implicit graph, according to embodiments described herein.

DETAILED DESCRIPTION

Figure 1:
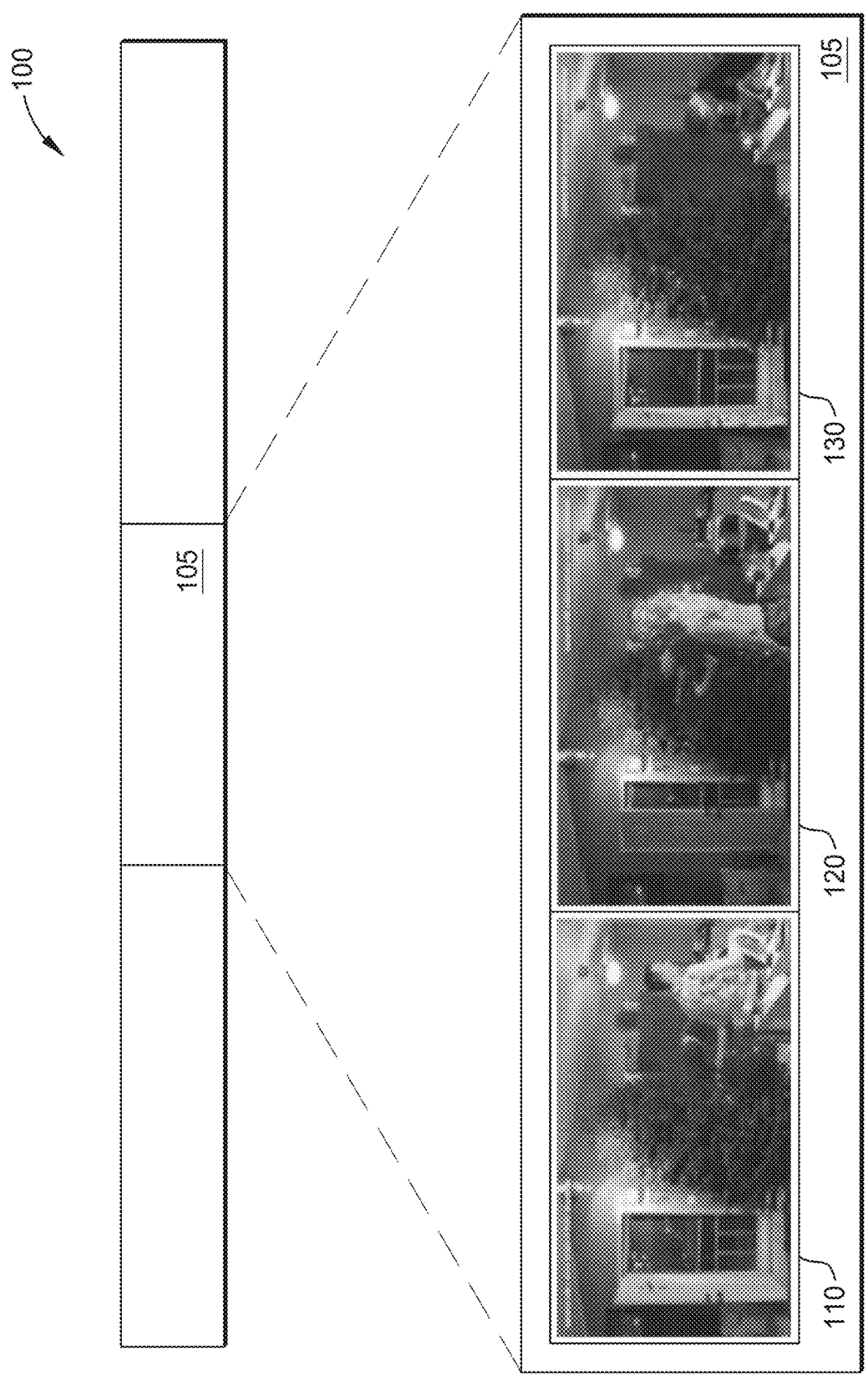
FIG. 1 illustrates a video input with a plurality of frames, according to embodiments described herein.

The process of producing a grounded video description (GVD) aims to generate grounded (i.e. contextual) and accurate natural language descriptions for video content by determining a correlation between words generated for the description and various objects detected in the processed video frames. Some solutions, such as conventional video description also aims to generate a natural language sentences to describe the video contents but can often fail to provide correct contextualization. For example, conventional video description may correctly include a description or words related to the detected object in a video, but the description may not correctly describe how the detected objects are interacting. For example, a video of a man petting a dog may be described by conventional video description as "a man sitting with a dog," since the act of petting the dog across multiple frames of the video content may not be detected by the conventional video description processes.

Some GVD methods advantageously model relationships between detected objects/regions in order to provide grounding or context between the objects and the associated descriptive generated text. However, some GVD methods often fail to efficiently model structural information in the video content by failing to accurately model the relationships among the detected object proposals in the video content and attending the relationships for text generation.

For example, GVD methods can either encode object/region proposals in the video content independently or by using self-attention-based mechanisms. These methods fail to consider implicit structural information among the region proposals and fail to handle noisy or fake relationships among objects in the various models. Further, the explicit structural features of objects (e.g., spatial, temporal, semantic) which are potentially important to discover the true relationships/correlations among the objects, are overlooked using self-attention only. Additionally, when generating sentences, some GVD methods use a top-down attention (e.g., the objects/relationships in the models are attended equally and individually) to focus on the relevant objects directly, regardless whether the video frames in which these objects are located are semantically related in a high level. This can lead to overemphasis on objects and frames that are not descriptive of the video content as a whole.

Furthermore, while relation graph based methods for image processing can contextualize video input, these methods focus on building relation graphs for specific images (e.g., one video frame or static image) and fail to build or connect relationships across time and spatial characteristics (e.g., from one video frame to another video frame). While graphs may be used to build relationships across multiple frames, redundancy of many objects in video content across time may create noisy graphs that overemphasize certain detected objects. For example, a static wall may be present in every frame of a video received from a non-moving video source (e.g., security camera footage), but emphasizing the wall in the various models for the video content and describing the wall in the GVD likely does not provide an accurate context of what is happening in the video content.

Embodiments herein provide a Hierarchical Attention based Spatial-Temporal Graph-to-Sequence Learning framework for producing a GVD. This is accomplished by generating an initial graph representing a plurality of object features in a plurality of frames of a received video input, generating an implicit graph for the plurality of object features in the plurality of frames, and combining the initial graph and the implicit graph to form a refined graph. The refined graph is processed to generate a hierarchical graph of the plurality of features for the plurality of frames, where the hierarchical graph and associated features are used by a language model to generate a GVD.

FIG. 1 illustrates a video input 100 with a plurality of frames, according to embodiments described herein. The video input 100 may include any type of video content, including live video content, recorded, or archival video content among other. The video content may be received from any source including from a video recording device, video storage, video content generator, etc. The video input 100 includes multiple video segments including a video segment 105. The video segment 105 includes multiple video frames including frames 110-130.

The video content shown in the frames 110-130 generally includes two men decorating a Christmas tree. As described above, some methods for video description may fail to adequately capture the relationships between the various object in the individual frames and across the frames as time passes. For example, some methods may overemphasize the door in the background of the frames such that a generated description includes a mention of the door when it is not relevant to the action being capture by the video content.

Additionally, some GVD techniques focus on a static image such as the frame 130 and may identify one man as decorating a Christmas tree while failing to identify a second man also decorating the tree shown in frames 110 and 120. Accurately modeling the relationships of the objects in the images shown in the frames 110-130 as well as modeling the relationship of the objects across the frames is needed to provide a grounded and accurate description of the video content. The system described in FIG. 2 provides a hierarchical attention based spatial-temporal graph-to-sequence learning framework to produce an accurate GVD.

Figure 2:
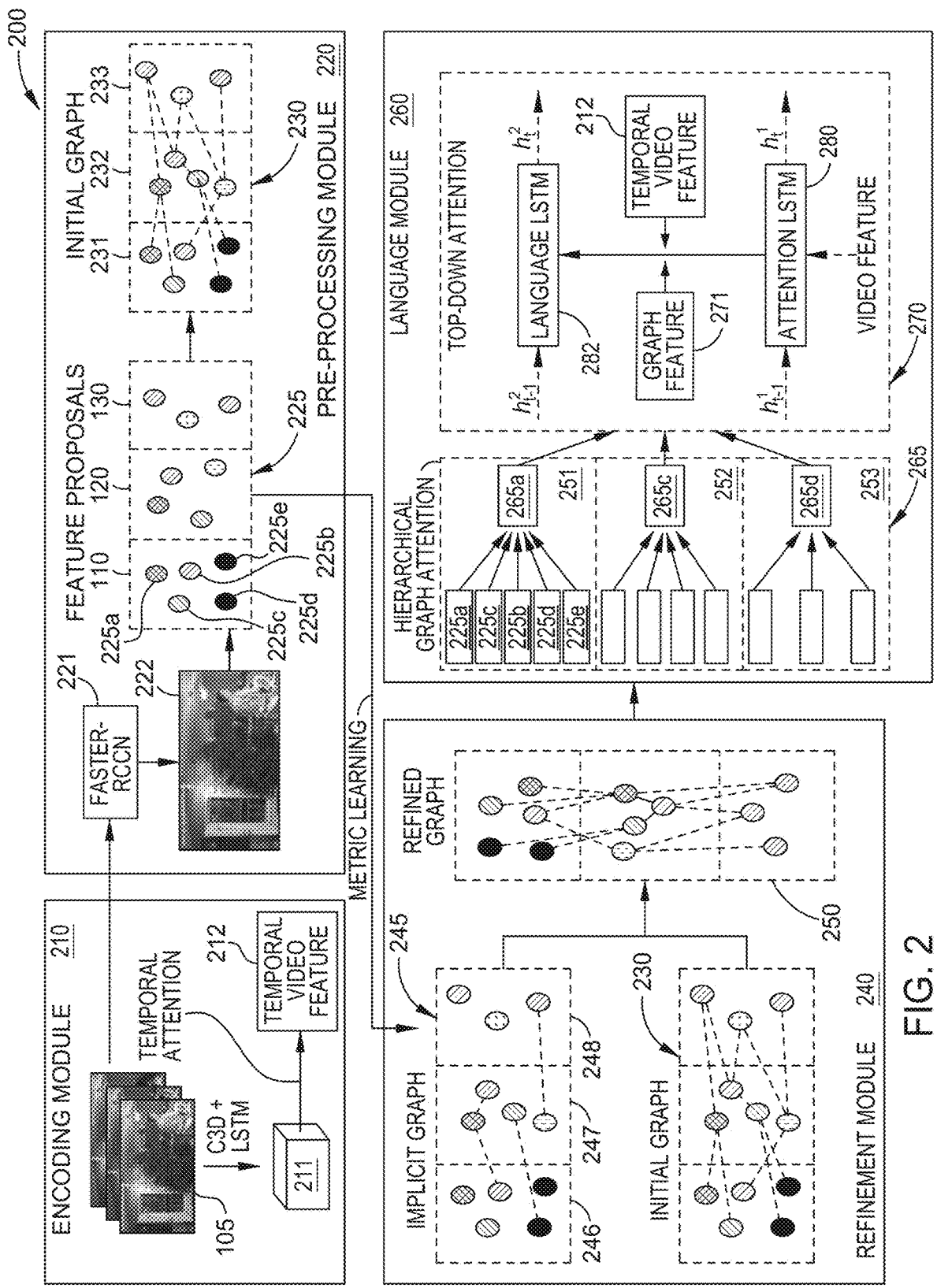
FIG. 2 illustrates a grounded video description system flow diagram, according to embodiments described herein.

FIG. 2 illustrates a grounded video description system flow diagram, according to embodiments described herein. The system 200 includes an encoding module 210, a pre-processing module 220, a refinement module 240, and a language module 260. The encoding module 210 receives video content, such as the video segment 105 and in some examples processes the video input to encode or produce two video streams. For example, the encoding module 210 using a 3D Convolutional Neural Network (C3D) and a Long-Short-Term-Memory (LSTM) encoder to produce a global level video feature 211 for the video segment 105. The Encoding module may also apply an attention algorithm to the global level video feature 211 to produce a temporal video feature 212.

In some examples, the encoding module 210 models the global level feature using a Bi-directional(Bi) LSTM network show in Equation 1:

$$h = \text{BiLSTM}(v) \quad (1)$$

In this example, "v" is the global feature (e.g., object feature) extracted by the C3D and h is the global level feature produced by the BiLSTM.

The encoding module 210 also processes the video segment 105 to produce a video stream provided to the pre-processing module 220. The pre-processing module 220 processes the video segment 105 using a first feature extraction mechanism, mechanism 221 to generate a plurality of object feature proposals for the video segment 105. In some examples, the mechanism 221 is a Faster-RCNN object detection method which produces various feature proposals shown in visual object proposal 222 and object feature proposals 225. For example, for the frame 110, the object feature proposals include the object features proposals 225a-225e.

In some examples, the pre-processing module 220 also enhances the proposed features from the mechanism 221 by applying classification and aggregation methods to enhance which features are important in the various frames. In some examples, enhancing the various feature proposals enables the system 200 to better determine relationships between the object features as described herein.

In some examples, the pre-processing module 220 also defines a data structure for the object feature proposals for use in modeling the object features. For example, the pre-processing module 220 may define each object feature proposal as a node for a video graph such as an initial graph 230. For example, the object feature proposals 225 include the object feature proposals 225a-225e as nodes for a graph. In some examples, the feature proposals include nodes for each frame of the video content.

In some examples, the initial graph 230 is generated by the pre-processing module 220 as a graph with locality where each object feature proposal is modeled as a node and each sampled frame is modeled as subgraph. For example, the frame 110 is associated with subgraph 231, the frame 120 is associated with the subgraph 232, and the frame 130 is associated with the subgraph 233. Each subgraph contains modeled connections or relationship with nodes in the adjacent subgraphs. Through this modeling process, the initial graph 230 captures the local spatial relations in single subgraphs (frames) and the local temporal relations between the subgraphs (frames). The pre-processing module 220 may also define the nodes in one single frame as a sub-graph, which includes the whole graph through temporal edges. In some examples, the initial graph 230 includes a topology which is undirected and weighted for simplicity in modeling. However, since the initial graph 230 includes the spatial-temporal information into the node feature space, this assumption does not cause excessive loss of the key position and temporal characteristics.

In some examples, the pre-processing module 220 produces the initial graph 230 without a trained classifier set (e.g., without previous image training on the video or related content). In this example, the pre-processing module 220 may utilize a k-nearest neighbors algorithm (KNN) to determine or detect correlations in a feature space for the object proposals in the frames 110-130. When a correlation or relationship is found between the various nodes (object features) in the frames, the pre-processing module 220 adds edges or connections between the correlated nodes.

In another example, the object feature proposals may be extracted using a pre-trained model which includes a semantic relation classifier. The semantic relation classifier may be used instead of the KNN to determine or detect the correlations between the various node/object features in the frames. An example, initial graph is shown in FIG. 3A.

FIG. 3A illustrates an initial graph 300 for the frames 110-130 shown in FIG. 1, according to embodiments described herein. As shown, each of the subgraphs associated with frames 110-130 include object features proposals. For example, the subgraph 310 (associated with the frame 110) includes object features 301-303. The object feature 301 includes a bounded region (region) defining a Christmas tree. The object feature 302 includes a region defining a first man and the object feature 303 includes a region defining a second man.

Similarly, the subgraph 320 (associated with the frame 120) includes object features 311-313, where the object feature 311 includes a region defining a Christmas tree, the object feature 312 includes a region defining a first man, and the object feature 313 includes a region defining a second man. The subgraph 330 (associated with the frame 130) includes object features 321-322 where the object feature 321 includes a region defining a Christmas tree and the object feature 322 includes a region defining a first man.

In some examples, the object features shown in FIG. 3A are enhanced as described above such that the pertinent or important features are presented in the initial graph 300. In some examples, as the pre-processing module 220 processes the subgraphs 310-330, detects correlations between the various object features (nodes) in the subgraphs and adds edges/relationships to the initial graph 300. For example, the object features 301, 311, and 321 all include the region defining the Christmas tree shown in the frames 110-130. Upon detection, the pre-processing module 220 adds edges 315 and 325 to the initial graph 300. Additional edges 316, 317, and 326 are added for the additional correlations/relationships detected in the subgraphs to form the initial graph 300.

Returning back to FIG. 2, the pre-processing module 220 also provides the object feature proposals 225 and the initial graph 230 to the refinement module 240. The refinement module 240 utilizes the object feature proposals 225 from the pre-processing module 220 to generate an implicit graph 245. In some examples, the implicit graph 245 is generated by the refinement module 240 as a graph with locality where each object feature proposal is modeled as a node and each sampled frame is modeled as subgraph.

For example, the frame 110 is associated with subgraph 246 the frame 120 is associated with the subgraph 247, and the frame 130 is associated with the subgraph 248. Each subgraph contains modeled connections or relationships with nodes in the adjacent subgraphs. In some examples, the refinement module uses a metric learning function in order to apply various weights to the feature proposals in the various subgraphs. For example, the refinement module 240 may use a multi-head weighted cosine similarity function shown in Equation 2.

$$A = \frac{1}{m} Xm \sum_{k=1}^{m} \cos(w^k \odot \hat{r}_i, w^k \odot \hat{r}_j) \qquad (2)$$

In this example, ⊙ denotes a Hadamard product, where "w" represents learnable weights, "m" is the heads number for the metric function, and "r" represent the region/object features. In some examples, applying the similarity function highlights some specific dimensions of the region/object features and correlates implicit relations beneficial to providing a GVD. In some examples, the weighted relationships are dropped from the graph when below a certain weight threshold which indicates the relationship is not strong among the subgraphs. This process simplifies the implicit graph 245 and allows the implicit graph to represent learned weighted relationships. An example, implicit graph is shown in FIG. 3B.

FIG. 3B illustrates an implicit graph 340 for the frames 110-130 shown in FIG. 1, according to embodiments described herein. As shown, each of the subgraphs of the implicit graph 340 are associated with frames 110-130 and include object features proposals. For example, the subgraph 351 (associated with the frame 110) includes the object features 301-303. Similarly, the subgraph 352 (associated with the frame 120) includes object features 311-313, and the subgraph 330 (associated with the frame 130) includes object features 321-322.

In some examples, the object features shown in FIG. 3B are enhanced as described above such that the pertinent or important features are presented in the implicit graph 340 and also processed using the weighted metric function shown in Equation 2. In some examples, as the refinement module 240 processes and weights the subgraphs 351-353, correlations between the various object features (nodes) in the subgraphs are detected and edges/relationships are added to the implicit graph 340. In this example, the object feature 312 interacts with the object feature 303, 311, and 321, as determined by the system 200, such that the edges 361, 363, and 365 are added to the graph 250 to illustrate the relationship. The edges 362 and 364 are also added to illustrate relationships between the subgraphs. In some examples, a relationship may be added to the implicit graph 340 and removed or dropped from the graph if below a certain weighted threshold.

Returning back to FIG. 2, the refinement module 240 fuses or combines the initial graph 230 with the implicit graph 245 to generate the refined graph 250. In some examples, the graphs are combined as shown in Equation 3.

$$A_{dir} = \lambda A_{init} + (1-\lambda) A_{impl} \qquad (3)$$

In this example, λ is a hyper-parameter selected to balance a trade-off between the initial graph 230 and the learned implicit graph 245. $A_{init}$ and $A_{impl}$ are normalized adjacency matrices of the initial graph 230 and implicit graph 245 respectively. In some examples, to make the refined graph undirected, the final adjacency matrix (A) for the refined graph is given by Equation 4:

$$A = (A_{dir} + A_{dir}^T)/2 \qquad (4)$$

Once A is determined for the refined graph 250, the refinement module 240 may further process the refined graph 250 to provide feature aggregation using a graph neural network (GNN) in the refined graph 250. For example, as shown in Equation 5 which is a GCN formula and includes a rectified linear activation unit (ReLU) which uses A along with a trainable weight "W" and an enhanced feature "$X^{in}$."

$$X^{out} = \text{ReLU}(\tilde{A}X^{in}W) \qquad (5)$$

The GCN formula is used in a Stack K basic module which includes the functions shown in Equations 6 and 7 to produce aggregated features $X^{out}$ for the refined graph 250.

$$X^{out} = \frac{GCN(X^{in}) + X^{in}}{\sqrt{2}} \qquad (6)$$

$$X^{out} = Laynorm(X^{out}) \qquad (7)$$

Figure 3C:
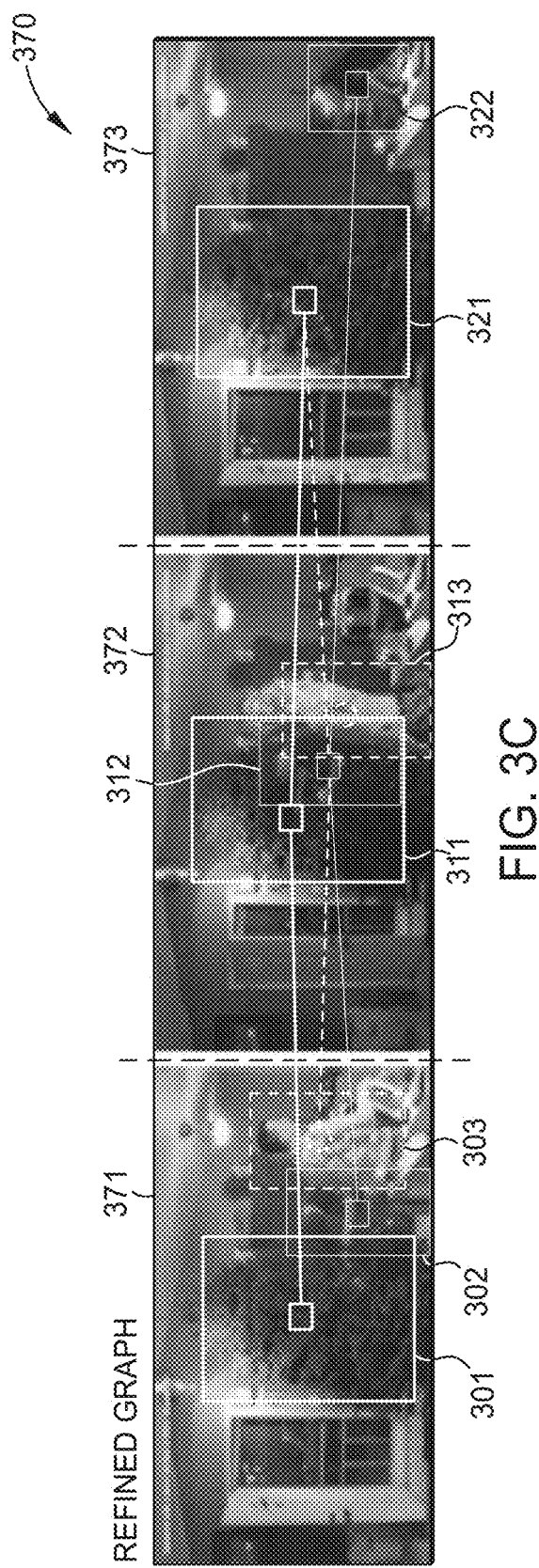
FIG. 3C illustrates a refined graph, according to embodiments described herein.

An example refined graph is shown in FIG. 3C where the refined graph 370 includes combined relationships/edges for subgraphs 371-373, where the combined relationships/edges are from the graphs 300 and 350 shown in FIGS. 3A and 3B. In some examples, the refined graph 370 includes lower weighted edges (e.g., source form the initial graph), higher weighted edges (e.g., sources from both the initial and implicit graphs), and edges added only from the implicit graph.

When the refined graph 350 is fused/combined and the features in the graph aggregated, the refinement module provides the refined graph to the language module 260 which provides hierarchal graph attention module 265 and top-down attention module 270.

In some examples, the hierarchical graph attention module 265 first represents each subgraph in the refined graph 250 as a vector such as using a mean pooling function on the subgraph (e.g., the subgraph 251 of the refined graph 250). The hierarchical graph attention module 265 then calculates an attention score for the subgraph to calculate attention graph feature 272 ($h_{attention}$) as shown in Equation 8, where $\alpha_i$ is an attention score for a subgraph and $\beta_{i,j}\tilde{R}_{i,j}$ is an attention score for the object features in the subgraph.

$$h_{attention} = \sum_{i=1}^{F} \alpha_i \sum_{j=1}^{N_i} \beta_{i,j} \tilde{R}_{i,j} \qquad (8)$$

In some examples, top-down attention module 270 is used to generate description for the video. The attention LSTM 280 is used to encode the visual features and the language LSTM 282 is used to generate words. In this example, the graph feature 271 is used to supplement a standard attention LSTM processing of the video frames inputted into attention LSTM 280 with the temporal video feature 212 produced by the encoding module 210. For example, language LSTM 282 uses the graph feature 271, temporal video feature 212 and the output of the attention LSTM 280 as inputs in a language attention function in order to produce a GVD for the video segment 105. The graph feature 271 allows for the language LSTM 282 to properly weigh the most important objects and frames for the GVD.

For example, for the language LSTM 282 uses the graph feature 271, which indicates that subgraph 372 (frame 120) is a primary frame for the segment 105 and that the primary relationships between the frames indicates a man interacting with the tree and another man also in the frames. The language LSTM 282 may in turn produces a GVD including: "A man is seen decorating a Christmas tree with a man beside him."

Figure 4:
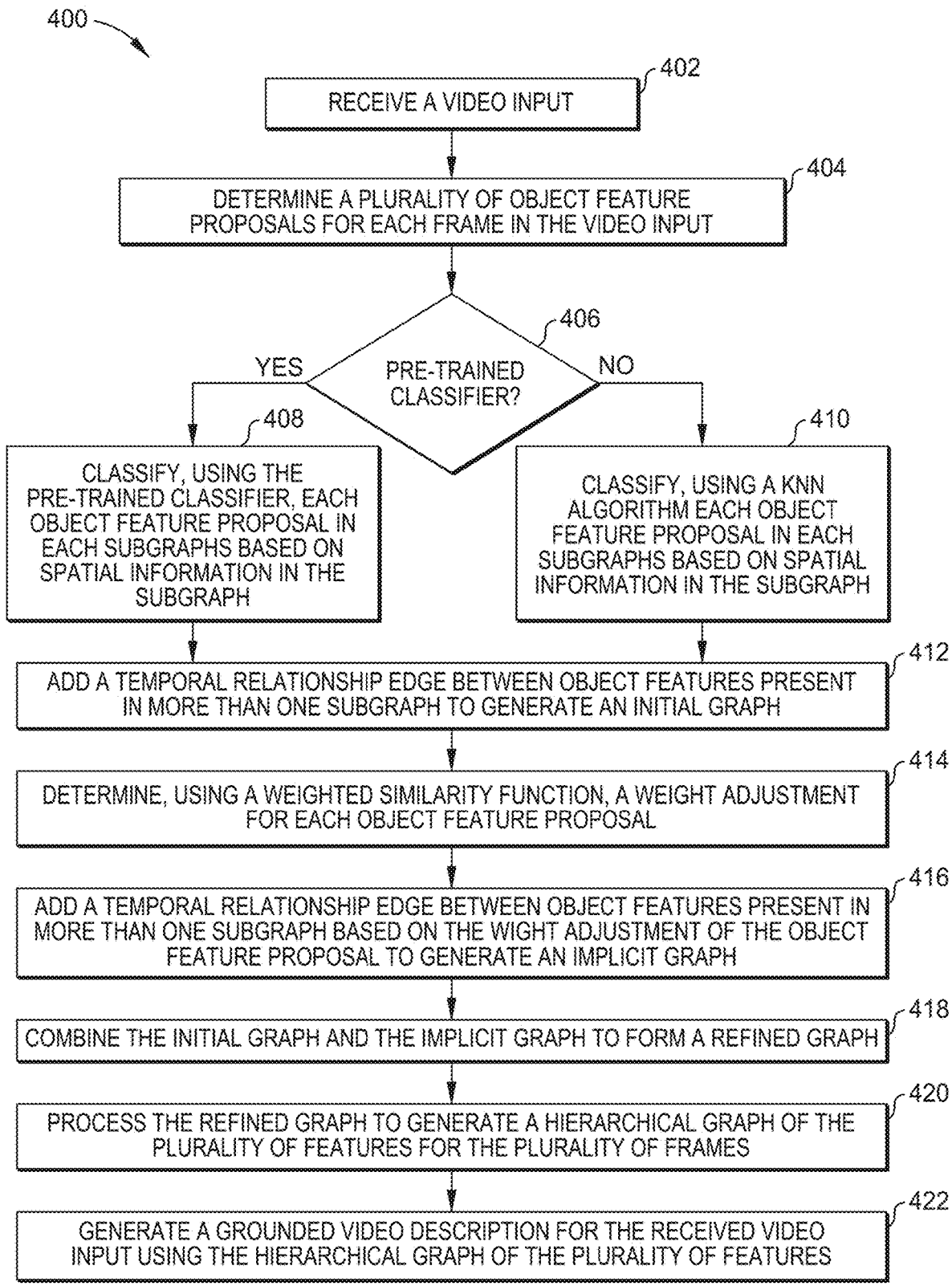
FIG. 4 is a method for generating a grounded video description, according to embodiments described herein.
Figure 5:
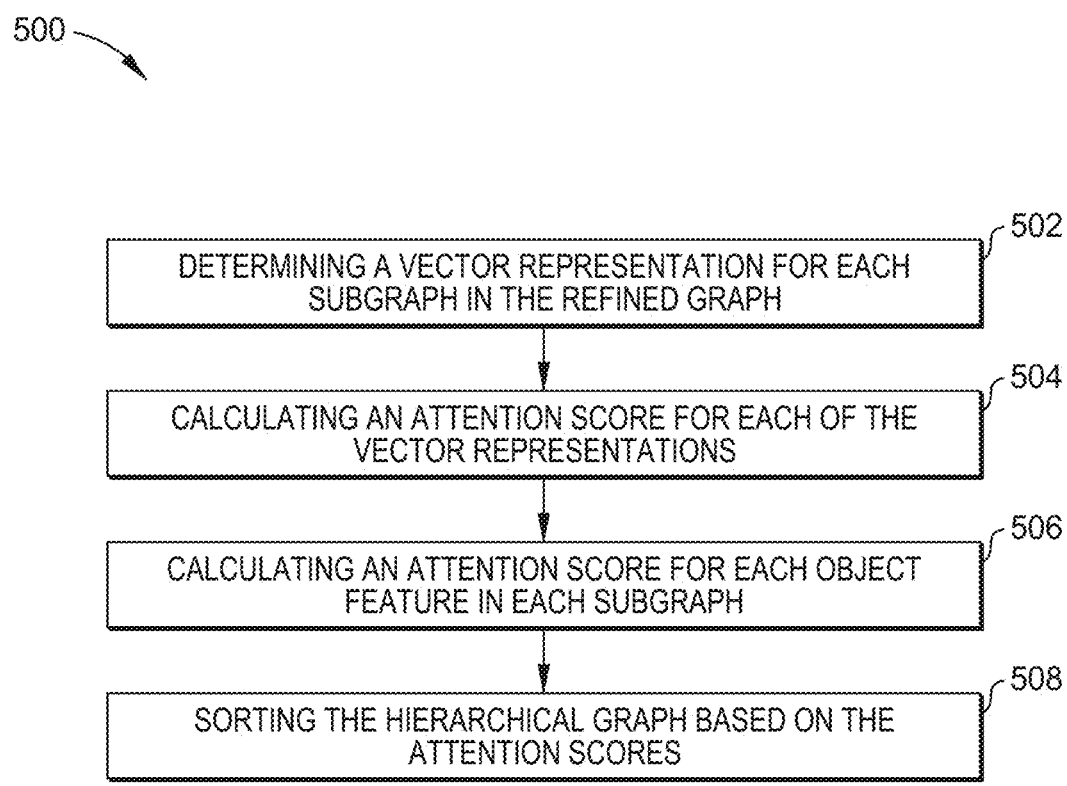
FIG. 5 is a method for generating a hierarchical graph, according to embodiments described herein.

FIG. 4 is a method 400 for generating a grounded video description, according to embodiments described herein. For ease of discussion the methods described in FIGS. 4-5 will refer to the examples and system 200 as described in FIGS. 1-3C. Method 400 begins at block 402 where the system 200 receives a video input. For example, as described in FIG. 2, the encoding module 210 receives video content, such as the video segment 105 (and/or video input 100) from a video source. In some examples, the system 200 processes the received video input such as the video segment 105 to encode or produce two video streams. For example, the encoding module 210 may use a C3D and LSTM encoder to produce the global level video feature 211 for the video segment 105 which in turn is used to produce the temporal video feature 212. The encoding module 210 also processes the video segment 105 to produce a video stream provide to the pre-processing module 220.

At block 404 the system 200 determines a plurality of object feature proposals for each frame/subgraph. For example, the pre-processing module 220 of system 200 may process the video segment 105 using a first feature extraction mechanism, mechanism 221 to generate a plurality of object feature proposals for the video segment 105. In some examples, the mechanism 221 is a Faster-RCNN object detection method which produces various feature proposals shown in visual object proposal 222 and object feature proposals 225. For example, for the frame 110, the object feature proposals include the object features proposals 225a-225e.

In some examples, the pre-processing module 220 also enhances the proposed features from the mechanism 221 by applying classification and aggregation methods to enhance which features are important in the various frames. In some examples, enhancing the various feature proposals enables the system 200 to better determine relationships between the object features as describe herein. Additionally, the pre-processing module 220 also defines a data structure for the object feature proposals for use in modeling the object features. For example, the pre-processing module 220 may define each object feature proposal as a node for a video relation graph such as an initial graph 230. For example, the object feature proposals 225 include the object feature proposals 225a-225e as nodes for a graph.

At block 406, the system 200 determines when the system 200 is using a pre-trained classifier (e.g., a pre-trained classifier is used to generate the object feature proposals). When the system 200 has a pre-trained classifier the method 400 proceeds to block 408, where the system 200 classifies, using the pre-trained classifier, each object feature proposal in each subgraph of the initial graph based on spatial information in the subgraph. When the system 200 is not using a pre-trained classifier, the method 400 proceeds to block 410 where the system 200 classifies, using a KNN algorithm, each object feature proposal in each subgraphs based on spatial information in the subgraph.

At block 412, the system 200 adds a temporal relationship edge between object features present in more than one subgraph to generate the initial graph based on the classification and information generated at block 406. Through this modeling process, the initial graph captures the local spatial relations in single subgraphs (frames) and the local temporal relations between the subgraphs (frames).

At block 414, the system 200 determines, using a weighted similarity function, a weight adjustment for each object feature proposal. For example, the system 200 uses a metric learning function shown in Equation 2 in order to apply various weights to the feature proposals in the various subgraphs.

At block 416, the system 200 adds a temporal relationship edge between object features present in more than one subgraph based on the weight adjustment of the object feature proposal to generate an implicit graph. In some examples, applying the similarity function highlights some specific dimensions of the object feature proposals which allows system 200 to correlate implicit relations beneficial to providing a GVD. In some examples, some weighted relationships edges are dropped from the implicit graph when below a certain weight threshold which indicates the relationship is not strong among the subgraphs.

At block 418, the system 200 combines the initial graph and the implicit graph to form a refined graph. For example, the system 200 fuses or combines the initial graph 230 with the implicit graph 245 to generate the refined graph 250 as described in relation to Equations 3 and 4. In some examples, the system 200 also further process the refined graph 250 to provide feature aggregation using a GNN in the refined graph, as described in relation to Equations 5-7.

At block 420, the system 200 processes the refined graph to generate an attended hierarchical graph of the plurality of object features for the plurality of frames. For example, as described in method 500 of FIG. 5, the system 200, at block 502, determines a vector representation for each subgraph in the refined graph. For example, system 200 may represent each subgraph in the refined graph as a vector such as using a mean pooling function on the subgraph.

At block 504, the system 200 calculates an attention score for each of the vector representations. At block 506, the system 200 calculates an attention score for each object feature in each subgraph. In some examples, the process of blocks 504 and 506 are executed in parallel as shown above in Equation 8. At block 508, the system 200 produces a graph feature based on the attention scores.

Returning back to block 422, the system 200 generates a grounded video description for the received video input using at least the hierarchical graph of the plurality of features. For example, the system 200, using a Language LSTM and at least the graph feature produced at block 508, generates a GVD for the video input. In some examples, the GVD may be associated/stored with the video segment 105, video input 100, and/or provided as an output to a user for real time GVD. The GVD produced using the information derived from the initial, implicit, and hierarchal graphs allow for the Language LSTM to produce an accurate and contextual GVD based on both spatial/structural information in the frames of the video input as well as the temporal information derived from the relationships built across the relation graphs described herein.

Figure 6:
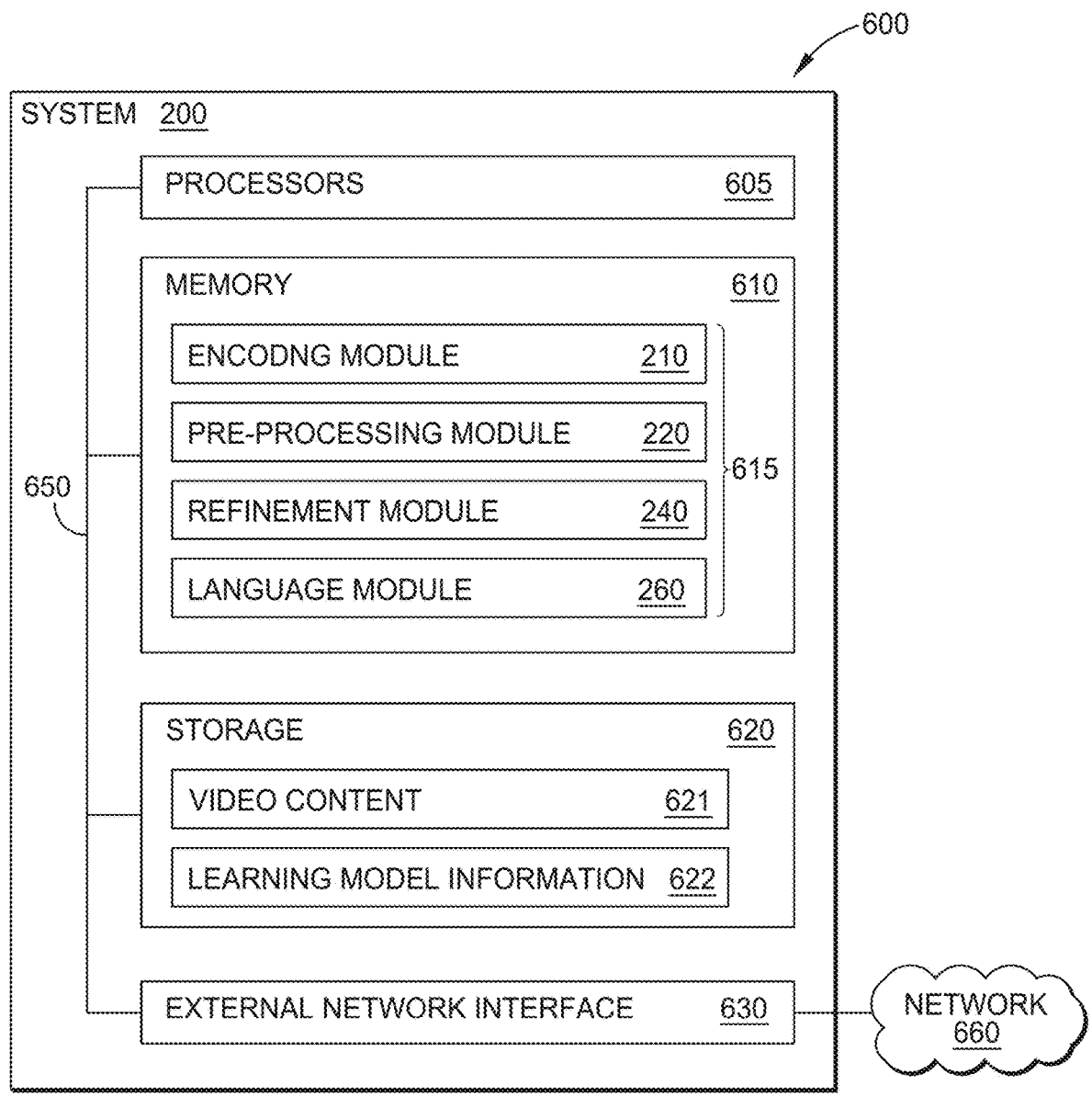
FIG. 6 is a block diagram of a grounded video description system, according to embodiments described herein.

FIG. 6 is a block diagram of the system 200 for according to embodiments described herein. The arrangement 600 includes the system 200 which is shown in the form of a general-purpose computing device. The components of the system 200 may include, but are not limited to, one or more processing units or processors 605, a memory 610, a storage system 620, network interface 630, and a bus 650 that couples various system components including the memory 610 and storage system 620 to processors 605 along with various input/output (I/O) components. In some embodiments, the arrangement 600 is distributed and includes a plurality of discrete computing devices that are connected through wired or wireless networking, where the discrete computing devices control/execute the various modules of the system 200 as shown in FIG. 2.

Bus 650 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

System 200 typically includes a variety of computer system readable media. Such media may be any available media that is accessible by the system 200, and it includes both volatile and non-volatile media, removable and non-removable media. Memory 610 can include computer system readable media in the form of volatile memory, such as random access memory (RAM) and/or cache memory. The system 200 may further include other removable/non-removable, volatile/non-volatile computer system storage media. By way of example, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 650 by one or more data media interfaces. As will be further depicted and described below, memory 610 may include at least one program product having a set (e.g., at least one) of program modules that are configured to carry out the functions of embodiments of this disclosure.

The system 200 may further include other removable/non-removable, volatile/non-volatile computer system storage media. In some examples, storage system 620 may be included as part of memory 610 and may typically provide a non-volatile memory for the networked computing devices, and may include one or more different storage elements such as Flash memory, a hard disk drive, a solid state drive, an optical storage device, and/or a magnetic storage device. For example, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 650 by one or more data media interfaces. Storage system 620 may include media for storing video content 621 and learning model information 622. The storage system 620 may be updated and accessed by program modules 915 described herein.

Memory 610 may include a plurality of program modules 615 for performing various functions described herein. The program modules 915 generally include program code that is executable by one or more of the processors 605. As shown, program modules 915 include the various modules described in FIG. 2.

Additionally, the system 200 may communicate with one or more networks such as a network 660 which may include a local area network (LAN), a general wide area network (WAN), and/or a public network (e.g., the Internet) via network interface 630. As depicted, network interface 630 communicates with the other components of the system 200 via bus 650. It should be understood that although not shown, other hardware and/or software components could be used in conjunction with system 200. Examples, include, but are not limited to: cloud computing systems, microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the system 200) or related data available in the cloud. Doing so allows

What is claimed is:

1. A method comprising:
generating an initial graph representing a plurality of object features in a plurality of frames of a video input by:
determining a plurality of object feature proposals for a plurality of subgraphs;
classifying each object feature proposal in each subgraph based on spatial information in the subgraph; and
generating a temporal relationship edge between object features present in more than one subgraph;
generating an implicit graph for the plurality of object features in the plurality of frames using a similarity function;
combining the initial graph and the implicit graph to form a refined graph;
processing the refined graph, using attention processes, to generate an attended hierarchical graph of the plurality of object features for the plurality of frames; and
generating a grounded video description for the received video input using at least the hierarchical graph.

2. The method of claim 1, wherein each subgraph of the plurality of subgraphs is associated with a frame of the plurality of frames.

3. The method of claim 2, wherein generating the initial graph comprises utilizing one of a k-nearest neighbor (KNN) algorithm or a pre-trained relation classifier.

4. The method of claim 2, wherein generating an implicit graph for the plurality of object features in the plurality of frames comprises:
determining, using a weighted similarity function, a weight adjustment for each object feature proposal; and
adding a temporal relationship edge between object features present in more than one subgraph based on the weight adjustment of the object feature proposal.

5. The method of claim 1, wherein combining the initial graph and the implicit graph to form a refined graph further comprises:
aggregating object features present in a plurality of subgraphs of the refined graph to represent deep correlations of the object features in the refined graph.

6. The method of claim 1, wherein processing the refined graph to generate a hierarchical graph of the plurality of features for the plurality of frames comprises:
determining a vector representation for each subgraph in the refined graph;
calculating an attention score for each of the vector representations;
calculating an attention score for each object feature in each subgraph; and
producing a graph feature based on the attention scores.

7. The method of claim 6, wherein generating the grounded video description comprises:
applying the graph feature in a language long short-term memory (LSTM) algorithm to determine the inclusion of a word associated with an object feature in the grounded video description.

8. A system comprising one or more computer processors and a memory containing a program which when executed by the computer processors performs an operation comprising:
generating an initial graph representing a plurality of object features in a plurality of frames of a received video input by:
determining a plurality of object feature proposals for a plurality of subgraphs;
classifying each object feature proposal in each subgraph based on spatial information in the subgraph; and
generating a temporal relationship edge between object features present in more than one subgraph;
generating an implicit graph for the plurality of object features in the plurality of frames using a similarity function;
combining the initial graph and the implicit graph to form a refined graph;
processing the refined graph, using attention processes, to generate an attended hierarchical graph of the plurality of object features for the plurality of frames; and
generating a grounded video description for the received video input using at least the hierarchical graph of the plurality of features.

9. The system of claim 8, wherein each subgraph of the plurality of subgraphs is associated with a frame of the plurality of frames.

10. The system of claim 9, wherein generating the initial graph comprises utilizing one of a k-nearest neighbor (KNN) algorithm or a pre-trained relation classifier.

11. The system of claim 9, wherein generating an implicit graph for the plurality of object features in the plurality of frames comprises:
determining, using a weighted similarity function, a weight adjustment for each object feature proposal; and
adding a temporal relationship edge between object features present in more than one subgraph based on the weight adjustment of the object feature proposal.

12. The system of claim 8, wherein combining the initial graph and the implicit graph to form a refined graph further comprises:
aggregating object features present in a plurality of subgraphs of the refined graph to represent deep correlations of the object features in the refined graph.

13. The system of claim 8, wherein processing the refined graph to generate a hierarchical graph of the plurality of features for the plurality of frames comprises:
determining a vector representation for each subgraph in the refined graph;
calculating an attention score for each of the vector representations;
calculating an attention score for each object feature in each subgraph; and
producing a graph feature based on the attention scores.

14. The system of claim 13, wherein generating the grounded video description comprises:
applying the graph feature in a language long short-term memory (LSTM) algorithm to determine the inclusion of a word associated with an object feature in the grounded video description.

15. A computer program product, the computer program product comprising:
a computer-readable storage medium having computer-readable program code embodied therewith, the computer-readable program code executable by one or more computer processors to perform an operation comprising:
generating an initial graph representing a plurality of object features in a plurality of frames of a received video input by:
determining a plurality of object feature proposals for a plurality of subgraphs;
classifying each object feature proposal in each subgraph based on spatial information in the subgraph; and
generating a temporal relationship edge between object features present in more than one subgraph;
generating an implicit graph for the plurality of object features in the plurality of frames using a similarity function;
combining the initial graph and the implicit graph to form a refined graph;
processing the refined graph, using attention processes, to generate an attended hierarchical graph of the plurality of object features for the plurality of frames; and
generating a grounded video description for the received video input using at least the hierarchical graph of the plurality of features.

16. The computer program product of claim 15, wherein each subgraph of the plurality of subgraphs is associated with a frame of the plurality of frames.

17. The computer program product of claim 16, wherein generating an implicit graph for the plurality of object features in the plurality of frames comprises:

determining, using a weighted similarity function, a weight adjustment for each object feature proposal; and
adding a temporal relationship edge between object features present in more than one subgraph based on the weight adjustment of the object feature proposal.

18. The computer program product of claim 15, wherein combining the initial graph and the implicit graph to form a refined graph further comprises:
aggregating object features present in a plurality of subgraphs of the refined graph to represent deep correlations of the object features in the refined graph.

19. The computer program product of claim 15, wherein processing the refined graph to generate a hierarchical graph of the plurality of features for the plurality of frames comprises:
determining a vector representation for each subgraph in the refined graph;
calculating an attention score for each of the vector representations;
calculating an attention score for each object feature in each subgraph; and
producing a graph feature based on the attention scores.

20. The computer program product of claim 19, wherein generating the grounded video description comprises:
applying the graph feature in a language long short-term memory (LSTM) algorithm to determine the inclusion of a word associated with an object feature in the grounded video description.

\* \* \* \* \*